United States Patent [19]

MacKay et al.

[11] 4,152,396

[45] May 1, 1979

[54] SEPARATION AND RECOVERY OF COBALT AND NICKEL FROM AQUEOUS SOLUTIONS THEREOF

[75] Inventors: Kenneth D. MacKay, Circle Pines, Minn.; John P. McDonald, Tucson, Ariz.

[73] Assignee: Henkel Corporation, Minneapolis, Minn.

[21] Appl. No.: 634,098

[22] Filed: Nov. 21, 1975

[51] Int. Cl.$^2$ .................. C01G 51/00; C01G 53/00
[52] U.S. Cl. .................................................. 423/139
[58] Field of Search ............................................ 423/139

[56] References Cited

U.S. PATENT DOCUMENTS

| | | | |
|---|---|---|---|
| 2,632,763 | 3/1953 | Hagemann | 260/332.3 |
| 3,700,416 | 10/1972 | Lucid | 423/139 |
| 3,725,046 | 4/1973 | Hartlage et al. | 423/139 |

OTHER PUBLICATIONS

Lakshman et al., *Solvent Extraction*, Society of Chemical Industry, London, (1974), vol. I, pp. 699–706.
Martell et al., *Chemistry of the Metal Chelate Compounds*, Prentice Hall, Inc., New Jersey, (1952), pp. 452, 453.
Stary, *The Solvent Extraction of Metal Chelates*, Pergamon Press, Ltd., London, (1964), pp. 32, 33, 37, 38, 44, 54, 60–62, 64.

*Primary Examiner*—Brian Hearn
*Attorney, Agent, or Firm*—Patrick J. Span; Gene O. Enockson

[57] ABSTRACT

Process for treating aqueous acidic solutions of cobalt and nickel values using certain fluorinated β-diketones wherein the cobalt values are preferentially stripped from the loaded organic phase. Variations include preferential extraction of cobalt values, recovery of nickel from the raffinate and a second stripping step to recover nickel from the loaded organic.

14 Claims, No Drawings

SEPARATION AND RECOVERY OF COBALT AND NICKEL FROM AQUEOUS SOLUTIONS THEREOF

The present invention relates to the liquid ion exchange separation and recovery of cobalt and nickel from aqueous solutions thereof. More particularly, it relates to such a process including the use of certain fluorinated β-diketones.

The separation of cobalt from nickel by solvent extraction is complex. It is especially difficult in extractions from aqueous acidic solutions or liquors. The reason for the difficulty lies primarily in the proximity of the pH extraction isotherms and $pH_{50}$ values (pH at which a metal is 50% extracted) of nickel and cobalt for most liquid ion exchange reagents.

Insofar as the solvent extraction chemical thermodynamics of $Ni^{2+}$ and $Co^{2+}$ ions are so similar, most efforts at separating nickel and cobalt by solvent extraction have been directed at distinguishing between the properties of $Ni^{2+}$ and $Co^{3+}$. The $Co^{3+}$ ion forms very stable complexes with ammonia and cyanide. Thus it is not too difficult to selectively extract $Ni^{2+}$ from $Co^{3+}$ in ammoniacal systems. However, the $Co^{3+}$ ion is not stable as the aquo complex $Co(H_2O)_6^{3+}$ and the separation of cobalt and nickel ions at low ($<7$) pH must be based on $Co^{2+}$ and $Ni^{2+}$ ions. To the best of our knowledge, there is no solvent extraction process of commercial significance for the separation of nickel and cobalt below pH 7 from sulfate solutions.

We have now discovered a process whereby nickel and cobalt can be separated and recovered from aqueous acidic solutions thereof. Essential features of our process involve the use of certain fluorinated β-diketones as the extractant and selective stripping of the divalent cobalt values therefrom. Other desirable features of the invention include selective extraction of the divalent cobalt values by control of contact time and degree of contact (mixing) and the recovery of nickel values by subsequent stripping.

The fluorinated β-diketones useful in the present invention have the formula

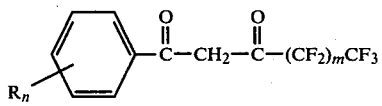

where n is a whole integer of 1-4, m is 0, 1 or 2 and R is an alkyl group of 1-25 carbon atoms with the proviso that $R_n$ must provide solubility properties sufficient for the diketones and the resulting divalent cobalt and nickel complexes to be soluble at a level of at least 2% by weight in essentially water-immiscible liquid hydrocarbon solvents. Preferably R will be branched chain and contain 8 or more carbon atoms when n is 1. Especially preferred compounds are those wherein R is a branched chain dodecyl group in the para position.

The preparation of a specific fluorinated β-diketone useful in the present invention is illustrated by the following Example:

EXAMPLE A

A dispersion of 84.5 g. (2 moles) of 57% sodium hydride in mineral oil was slurried with n-pentane and the supernatant was removed by suction through a sintered glass dip tube. The process was repeated three times before 500 ml. of ethyl ether was added at once. The mixture was slurried and 284 g. (2 moles) of ethyltrifluoroacetate was rapidly added. Then about 2 ml. of dodecylacetophenone (the dodecyl group is branched chain and was derived from a synthetic alkylbenzene—Chevron alkylate 21—in which the alkyl chain is branched and contains an average of 12 carbon atoms) were added to the slurry and gas evolution occurred immediately as evidenced on a wet test meter. Two hundred eighty eight grams (about 1 mole) of the dodecyl acetophenone were diluted with 500 ml. of ethyl ether and added to the reaction mixture at such a rate as to maintain reflux. The time of addition was three hours. When the addition was complete, the mixture was stirred another 30 minutes at which time gas evolution had ceased. Another 500 ml. of ethyl ether was added and the excess sodium hydride was neutralized by the slow addition of absolute alcohol, then a small amount of water. When the sodium hydride failed to react, the mixture was poured onto a mixture of ice and hydrochloric acid with vigorous stirring. The phases then were separated and the upper organic layer was washed twice with water. After drying over anhydrous magnesium sulfate, the solvent was distilled under reduced pressure. There was obtained 372.6 g. of β-diketone reagent (distilled at 135°-55° C. - 0.3-0.4 mm. Hg.) having the formula:

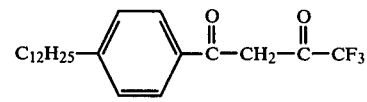

In the process of our invention, the described fluorinated β-diketones are dissolved in an essentially water-immiscible organic solvent and the resulting solution is contacted with the aqueous acidic solution of the cobalt and nickel values. The solvents are preferably aliphatic or aromatic hydrocarbons such as the petroleum derived liquid hydrocarbons including kerosene, fuel oil, etc. Kerosene is in wide use in the liquid ion exchange recovery of metal values and is the currently preferred solvent. In addition to the simple hydrocarbon solvents, chlorinated hydrocarbons may also be used. Accordingly, both the unsubstituted and the chlorinated solvents are contemplated by the term "liquid hydrocarbon."

The fluorinated β-diketones are used in an amount sufficient to extract at least a portion of the divalent cobalt and nickel values from the aqueous acidic solutions thereof. Preferably, the said diketones will be used in amounts of about 2 to 15% by weight based on the weight of the solvent.

The organic solution also desirably contains a long chain alcohol. Such alcohols contain from about 6 to 18 carbon atoms and are used to improve loading and/or increase extraction kinetics. Preferably from about 1 to 20% by weight of the said alcohols based on the weight of the solvent are used.

The divalent cobalt and nickel containing aqueous solutions have a pH of below 7.0. Such solutions can contain various amounts of recoverable cobalt and nickel and our process has particular use with respect to sulfate or chloride solutions containing the cobalt and nickel values. Further, the cobalt:nickel ratio can vary but, as described below, where significant amounts of nickel values are present in comparison to the divalent cobalt values, the extraction step will desirably be controlled to preferentially extract the divalent cobalt values. The ability of the fluorinated β-diketones to extract cobalt preferentially and also to allow cobalt to be stripped preferentially is an unexpected advance provided by the present invention. Normally, if a reagent extracts one metal in preference to another, the first metal will be the most difficult metal to strip. This is so since stripping is the reverse of extraction. However, because of the very slow stripping kinetics of the fluorinated β-diketone-nickel complex, this situation does not occur.

As indicated, the organic phase is contacted with the aqueous phase to extract at least a portion of the cobalt and nickel values into the organic phase. Where the starting aqueous phase is already rich in divalent cobalt values in comparison to nickel values, no special control need be exercised over the extraction time and contact conditions (i.e. mixing). However, where it is desired to preferentially extract the cobalt values, such conditions can be controlled such as to extract a greater quantity of divalent cobalt than nickel. In this respect, even with excellent pH control, it is not possible to obtain good nickel-cobalt separations under equilibrium conditions since both metal values are extracted together. However, as will be shown, cobalt values are preferentially extracted at short contact times. Thus the contact time and degree of contact (mixing of the phases) are preferably controlled to provide a % cobalt extraction over % nickel extraction of at least two to one and up to ten to one and higher. In this regard contact times are preferably held to below about ten minutes and even more preferably to less than five minutes. At contact times of one minute or less, the % ratio of cobalt to nickel extracted approaches 10:1 and higher. It is understood that the phases are well mixed during the indicated contact times.

After the extraction step is completed, the metal pregnant organic phase is separated from the extracted aqueous phase (the raffinate), and then stripped preferentially of cobalt values using an aqueous acidic stripping medium. This preferential stripping is controlled primarily by pH of the aqueous stripping medium but also by contact as will be apparent from the Examples. The cobalt strip stage is preferably carried out at a pH of about 1.5 to 3.5 at contact times of less than about ten minutes. At any rate, the cobalt stripping stage is carried out to preferentially strip cobalt over nickel in % stripped of at least 2:1 and preferably at least 10:1.

Subsequent to the cobalt strip stage, the organic phase can then be further stripped for longer periods of time and/or higher acid concentrations to strip the nickel values therefrom. Thus there is obtained a first strip solution rich in cobalt and a second strip solution rich in nickel. The cobalt and nickel can then be conventionally recovered from these strip solutions by precipitation, crystallization, hydrogen reduction or electrowinning.

Other variations of the invention will be apparent to those skilled in the art. Thus multiple extraction and/or strip stages can be used to produce even greater degrees of separation of nickel and cobalt. The starting aqueous solutions after essentially all of the cobalt has been extracted therefrom leaving nickel values can be extracted with the organic phase and then nickel can be stripped therefrom. Also where the starting aqueous solutions contain other metal contaminants such as $Fe^{+3}$ and $Al^{+3}$, the same are desirably first removed to avoid coextraction with the cobalt and nickel. Phase ratios are those conventionally used and for practical purposes will be in the range of organic to aqueous of 10:1 to 1:10 (both extraction and stripping).

The following examples serve to illustrate preferred embodiments of the invention without being limiting (all extraction and stripping operants to each of the mixtures. The concentration of ammonium hydroxide was varied from 0.0 M to 0.3 M to assure a wide range of equilibrium pH values. When the ammonium hydroxide containing solution additions were complete, the mixtures were shaken an additional 60 minutes. Then the phases were allowed to separate and the organic phase was analyzed for nickel or cobalt (atomic absorption) and the pH of the aqueous phase was measured. Results are set forth in the following Table I-A:

TABLE I-A

| pH | $Ni^{2+}$ Org. g./l. | pH | $Co^{2+}$ Org. g./l. |
|---|---|---|---|
| 4.1 | 0.05 | 3.9 | 0.06 |
| 4.3 | 0.77 | 4.5 | 0.63 |
| 4.8 | 1.52 | 5.3 | 1.23 |
| 5.9 | 2.05 | 6.2 | 1.87 |
| 7.0 | 2.13 | 7.3 | 2.08 |
| 7.5 | 2.14 | 7.8 | 2.22 |
| 7.8 | 2.21 | 8.0 | 2.24 |

As is apparent from the data of Table I-A, even with good pH control, it would not be possible to obtain significant nickel-cobalt separations under equilibrium conditions. Accordingly, the following run shows that cobalt can be preferentially extracted from nickel. An organic solution was prepared which contained 10% wt./vol. of the fluorinated β-diketone as used above and 10 volume % of the isodecanol in kerosene (Kerr-Mac 470). Two parts by volume of the organic solution were placed in a square mixing vessel with one part by volume of an aqueous solution which was 0.1 M in $NiSO_4$ and 0.1 M in $CoSO_4$. The vessel was equipped with a paddle affixed to a variable speed electric motor to provide agitation. Agitation of the mixture was begun at 3000 rpm and one part by volume of an aqueous solution 0.3 M in $NH_4OH$ and 2.0 M in $(NH_4)_2SO_4$ was added at once. The addition of the latter solution was considered time=zero. Then aliquots of the agitated mixture were taken at various time intervals. After phase separation of each aliquot, the organic phase was analyzed for nickel and cobalt by atomic absorption and the pH of the aqueous phase was measured. Results are set forth in Table I-B:

Table I-B

| Time | $Ni^{2+}$ Org. g./l. | $Co^{2+}$ Org. g./l. | pH |
|---|---|---|---|
| 15 sec. | 0.21 | 2.27 | 5.4 |
| 30 sec. | 0.24 | 2.28 | 5.4 |
| 1 min. | 0.28 | 2.22 | 5.1 |
| 2 min. | 0.37 | 2.14 | 5.1 |
| 5 min. | 0.56 | 1.98 | 5.1 |
| 10 min. | 0.79 | 1.77 | 4.9 |

Based on the above data, preferential extraction of cobalt was achieved.

The examples which follow next demonstrate that cobalt can be selectively stripped.

EXAMPLE II

Two parts by volume of a solution of 4% wt./vol. of the fluorinated $\beta$-diketone as used in Example I and 10 vol. % of the isodecanol in kerosene (Kerr-Mac 470) were shaken with one part by volume of 0.1 M $CoSO_4$ in water and one part by volume of 0.3 M $NH_4OH$ and 2.0 M $(NH_4)_2SO_4$ in water for one hour. After shaking, the loaded organic phase was placed in the mixing vessel described in Example I and agitated at 2500 rpm. An equal volume of aqueous $H_2SO_4$ (25 g./l.) was added at once. The time that the aqueous sulfuric acid addition was complete was considered time=zero. Aliquots of the mixed phases were taken at various time intervals and, after separation, both phases were analyzed for $Co^{2+}$. The results are set forth in Table II:

Table II

| Time | $Co^{2+}$ Org. g./l. | $Co^{2+}$ Aq. g./l. |
|---|---|---|
| 15 sec. | 0.19 | 2.20 |
| 30 sec. | 0.03 | 2.43 |
| 1 min. | 0.02 | 2.39 |
| 2 min. | 0.02 | 2.52 |
| 5 min. | 0.02 | 2.47 |
| 10 min. | 0.02 | 2.47 |

EXAMPLE III

Example II was repeated except that $NiSO_4$ was substituted for $CoSO_4$. Results are set forth in Table III:

Table III

| Time | $Ni^{2+}$ Org. g./l. | $Ni^{2+}$ Aq. g./l. |
|---|---|---|
| 15 sec. | 2.18 | 0.06 |
| 30 sec. | 2.03 | 0.14 |
| 1 min. | 1.74 | 0.26 |
| 2 min. | 1.38 | 0.48 |
| 5 min. | 0.65 | 1.19 |
| 10 min. | 0.24 | 1.50 |

EXAMPLE IV

Example III was repeated except that the $H_2SO_4$ concentration was changed to 150 g./l. Results are set forth in Table IV:

Table IV

| Time | $Ni^{2+}$ Org. g./l. | $Ni^{2+}$ Aq. g./l. |
|---|---|---|
| 15 sec. | 1.51 | 0.09 |
| 30 sec. | 1.37 | 0.17 |
| 1 min. | 0.89 | 0.43 |
| 2 min. | 0.31 | 1.27 |
| 5 min. | 0.02 | 2.04 |
| 10 min. | 0.0005 | 2.06 |

EXAMPLE V

Example II was repeated except 10% wt./vol. of the diketone was used, the cobalt solution was 0.2 M $CoSO_4$, 0.6 M $NH_4OH$ was used and the agitation was at 625 rpm. Results are given in Table V:

Table V

| Time | $Co^{2+}$ Org. g./l. | $Co^{2+}$ Aq. g./l. |
|---|---|---|
| 15 sec. | 1.47 | 0.57 |
| 30 sec. | 1.35 | 0.61 |
| 1 min. | 0.49 | 2.61 |
| 2 min. | 0.17 | 3.10 |
| 5 min. | 0.02 | 3.22 |
| 10 min. | 0.008 | 3.42 |

EXAMPLE IV

Example V was repeated except that 0.2 M $NiSO_4$ was used in place of $CoSO_4$. Results are set forth in Table VI:

Table VI

| Time | $Ni^{2+}$ Org. g./l. | $Ni^{2+}$ Aq. g./l. |
|---|---|---|
| 15 sec. | 4.75 | 0.018 |
| 30 sec. | 4.80 | 0.03 |
| 1 min. | 4.80 | 0.05 |
| 2 min. | 4.75 | 0.09 |
| 5 min. | 4.48 | 0.30 |
| 10 min. | 4.13 | 0.63 |

EXAMPLE VII

A counter-current liquid ion exchange circuit consisting of three extraction stages, three cobalt stripping stages, one cobalt scrub stage and one nickel strip stage was set up. The aqueous feed was an aqueous solution of 15 g./l. $Co^{++}$ and 0.645 g./l. $Ni^{+2}$ as sulfates and was adjusted to a pH of 6.0–7.0 in the extraction mixers. The organic extractant was a solution of 10.0% wt./vol. of the fluorinated $\beta$-diketone as used in Example I and 10 volume % of isodecanol in kerosene (Kerr-Mac 470). In the extraction stages the aqueous flow rate was 11.6 ml./min. and the organic flow rate was 46 ml./min. (O/A ratio of approximately 4/1). The aqueous raffinate analyzed 0.10 g./l. $Co^{+2}$ and 0.050 g./l. $Ni^{+2}$. The strip solution was made up from technical grade cobalt sulfate and contained 5.55 g./l. $Co^{+2}$ and 0.04 g./l. $Ni^{+2}$. The pH of the strip solution was 2.7–3.2 in the first two stages and 2.2 in the third stage (pH was adjusted with $H_2SO_4$ and/or $NH_4OH$). The flow rate of the strip solution was 10.4 ml./min. and thus the O/A was approximately 4.5/1. The pregnant strip solution analyzed 14 g./l. $Co^{+2}$ and 0.046 g./l. $Ni^{30\ 2}$. Thus the cobalt content was increased from 5.55 g./l. to 14 g./l. or a net increase of 8.45 g./l. $Co^{++}$. There was a net nickel increase of only 0.006 g./l. $Ni^{++}$ for a Co/Ni separation ratio of 1400. The stripped organic was then scrubbed by contact with an aqueous sulfuric acid solution at a pH of 1.5–1.7 (O/A=7/1). The resulting scrub solution containing 1.4 g./l. $Co^{+2}$ and 0.01 g./l. $Ni^{+2}$ and could be returned to the aqueous feed for extraction. The stripped and scrubbed organic was contacted with aqueous sulfuric acid (100 g./l. $H_2SO_4$) at an organic:aqueous phase ratio of 6.2:1 (flow rate of nickel strip solution was 7.4 ml./min.). The strip solution contained 0.59 g./l. $Ni^{+2}$ and 0.54 g./l. $Co^{+2}$. The whole system was operated continuously with the stripped organic being recycled for further extractions with the above analyses being typical of the various solutions during operation. Total average time from initial contact of the organic with the aqueous feed through the nickel strip stage was approximately 50 min.

The embodiments of the invention in which an exclusive property or privilege is claimed are defined as follows:

1. A process for treating an aqueous acidic solution containing divalent cobalt and nickel values comprising contacting said solution with a solution of a fluorinated β-diketone in an essentially water-immiscible organic solvent to extract at least a portion of the metal values into the organic phase, separating the organic phase from the aqueous phase and preferentially stripping cobalt values from the loaded organic phase using an aqueous acidic stripping medium, said fluorinated β-diketone having the formula

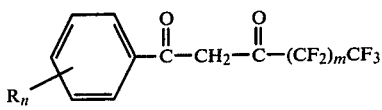

where n is a whole integer of 1 to 4, m is 0, 1 or 2 and R is an alkyl group of 1–25 carbon atoms with the proviso that $R_n$ must provide solubility properties sufficient for the β-diketone and the resulting cobalt and nickel complexes thereof to be soluble at a level of at least 2% by weight in the solvent.

2. The process of claim 1 wherein the essentially water-immiscible organic solvent is a liquid hydrocarbon.

3. The process of claim 1 wherein the fluorinated β-diketone is used in an amount of about 2 to 15% by weight in the organic solvent.

4. The process of claim 1 wherein the fluorinated β-diketone has the formula

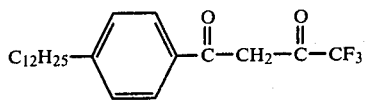

5. The process of claim 1 wherein the organic solution also contains a long chain alcohol of 6 to 18 carbon atoms in an amount of about 1 to 20% by weight in the organic solvent sufficient to improve loading and/or increase extraction kinetics.

6. The process of claim 5 wherein the alcohol is isodecanol.

7. The process of claim 1 wherein contacting of the aqueous acidic solution containing divalent cobalt and nickel values with the fluorinated β-diketone solution is for less than about ten minutes.

8. The process of claim 8 wherein the contacting is for less than five minutes.

9. The process of claim 1 wherein the aqueous acidic stripping medium has a pH of about 1.5 to 3.5.

10. The process of claim 10 wherein the stripping is carried out to preferentially strip cobalt values over nickel values in % stripped of at least 2:1.

11. The process of claim 10 wherein the % stripped ratio is at least 10:1.

12. The process of claim 1 wherein the stripping is completed in less than about ten minutes.

13. The process of claim 1 wherein the cobalt stripped organic phase is separated from the cobalt rich stripping medium and then subjected to a further stripping step to strip nickel values therefrom.

14. The process of claim 13 wherein the cobalt and nickel stripped organic phase is recycled for contacting further quantities of the aqueous acidic solution containing divalent cobalt and nickel values.

* * * * *

UNITED STATES PATENT AND TRADEMARK OFFICE
CERTIFICATE OF CORRECTION

PATENT NO. : 4,152,396
DATED : May 1, 1979
INVENTOR(S) : MAC KAY, Kenneth D., McDONALD, John P.

It is certified that error appears in the above-identified patent and that said Letters Patent are hereby corrected as shown below:

Col. 4, line 7, "operants" should read - operations -

Col. 4, line 7, before "to each", insert omitted portion:

- were carried out at ambient temperature--i.e. approximately 25°C.--with careful control at 25°C.± 0.5°C. in Examples I-IV).

EXAMPLE I

The degree of extraction of nickel and cobalt was first determined as a function of pH. A $0.1\underline{M}$ kerosene (Kerr-Mac 470) solution of fluorinated β-diketone (as prepared in Example A) which solution also contained 10% by volume iso-decanol (Union Carbide mixture of $C_{10}$ alcohols) was prepared and used in 10 ml. quantities. To each 10 ml. of the organic, 5 ml. of $0.1\underline{M}$ $NiSO_4$ or $CoSO_4$ in $H_2O$ was added and the mixtures were shaken. During shaking, an additional 5 ml. of ammonium hydroxide in $2\underline{M}$ aqueous ammonium sulfate was added in 1 ml. increments -

Col. 8, Claim 8, "Claim 8" should read - Claim 7 -

Col. 8, Claim 10, "Claim 10" should read - Claim 9 -

Signed and Sealed this

Seventeenth Day of July 1979

[SEAL]

Attest:

LUTRELLE F. PARKER

*Attesting Officer*    *Acting Commissioner of Patents and Trademarks*